(12) United States Patent
Oda et al.

(10) Patent No.: US 10,381,650 B2
(45) Date of Patent: Aug. 13, 2019

(54) CLADDING MATERIAL FOR BATTERY COLLECTOR AND ELECTRODE

(71) Applicant: HITACHI METALS, LTD., Minato-ku, Tokyo (JP)

(72) Inventors: Yoshimitsu Oda, Tokyo (JP); Ryoji Inoue, Tokyo (JP); Kenichi Funamoto, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 285 days.

(21) Appl. No.: 15/433,092

(22) Filed: Feb. 15, 2017

(65) Prior Publication Data

US 2017/0162877 A1  Jun. 8, 2017

Related U.S. Application Data

(62) Division of application No. 14/725,116, filed on May 29, 2015.

(30) Foreign Application Priority Data

May 30, 2014 (JP) .................................. 2014-112310

(51) Int. Cl.
*H01M 4/66* (2006.01)

(52) U.S. Cl.
CPC .......... *H01M 4/667* (2013.01); *H01M 4/662* (2013.01)

(58) Field of Classification Search
CPC .............................. H01M 4/667; H01M 4/662
See application file for complete search history.

(56) References Cited

U.S. PATENT DOCUMENTS

| 9,017,877 B2 | 4/2015 | Sato et al. |
| 2004/0101752 A1 | 5/2004 | Oosawa et al. |
| 2004/0253512 A1 | 12/2004 | Watanabe et al. |
| 2008/0292963 A1* | 11/2008 | Sato ...................... H01M 4/661 |
| | | 429/218.1 |
| 2010/0319188 A1 | 12/2010 | Yamazaki et al. |

FOREIGN PATENT DOCUMENTS

| JP | 5-121279 A | 5/1993 |
| JP | 8-7926 A | 1/1996 |
| JP | 9-232003 A | 9/1997 |
| JP | 2000-100471 A | 4/2000 |

(Continued)

OTHER PUBLICATIONS

Decision of Refusal dated Dec. 5, 2017, issued in counterpart Japanese Application No. 2014-112310, with English machine translation. (4 pages).

(Continued)

*Primary Examiner* — Jimmy Vo

(74) *Attorney, Agent, or Firm* — Westerman, Hattori, Daniels & Adrian, LLP

(57) ABSTRACT

This cladding material for a battery collector consists of a cladding material having a two-layer structure formed by bonding a first layer arranged on a first surface and constituted of an Al-based alloy and a second layer arranged on a second surface and constituted of a Cu-based alloy to each other by rolling. The ratio of the thickness of the first layer to the total thickness of the first layer and the second layer is not more than 35%.

8 Claims, 3 Drawing Sheets

(56) References Cited

FOREIGN PATENT DOCUMENTS

| JP | 2008-140552 A | 6/2008 |
|---|---|---|
| JP | 2009-4363 A | 1/2009 |
| JP | 2011-23710 A | 2/2011 |
| JP | 5204573 B2 | 6/2013 |
| JP | 2013-225558 A | 10/2013 |
| JP | 5329290 B2 | 10/2013 |
| JP | 2005339923 A | 12/2015 |

OTHER PUBLICATIONS

Decision to Decline the Amendment dated Dec. 5, 2017, issued in counterpart Japanese Application No. 2014-112310, with English machine translation. (9 pages).
Office Action dated Nov. 15, 2016, issued in counterpart Japanese Patent Application No. 2014-112310, with English translation. (14 pages).
Office Action dated Jun. 12, 2018, issued in counterpart Japanese Application No. 2017-149249, with English machine translation (9 pages).
Office Action dated Mar. 16, 2017, issued in counterpart Korean Application No. 10-2015-0073836, with English translation. (24 pages).
Non-Final Office Action dated May 3, 2018, issued in U.S. Appl. No. 14/725,116. (16 pages).
Non-Final Office Action dated Jan. 31, 2019, issued in U.S. Appl. No. 14/725,116. (9 pages).
Office Action dated Jan. 8, 2019, issued in counterpart JP Application No. 2017-149249, with English translation (9 pages).

\* cited by examiner

FIG.5 FIRST EMBODIMENT (Al LAYER/Cu LAYER)

| | THICKNESS AFTER ROLLING (t2/t3) (μm) | THICKNESS RATIO OF Al LAYER (%) | WIDTH WARP AFTER ROLLING (mm) | LONGITUDINAL WARP AFTER ROLLING (mm) | WIDTH WARP AFTER HEAT TREATMENT (mm) |
|---|---|---|---|---|---|
| EXAMPLE 1 | 10/40 | 20 | +0.3 | +0.3 | -0.6 |
| EXAMPLE 2 | 15/35 | 30 | +0.4 | +1.9 | -1.2 |
| COMPARATIVE EXAMPLE 1 | 20/30 | 40 | +1.3 | +7.1 | -1.5 |
| COMPARATIVE EXAMPLE 2 | 25/25 | 50 | +2.8 | +10.1 | -1.9 |

THICKNESS RATIO OF Al LAYER (%)=(t2/(t2+t3))×100

FIG.6

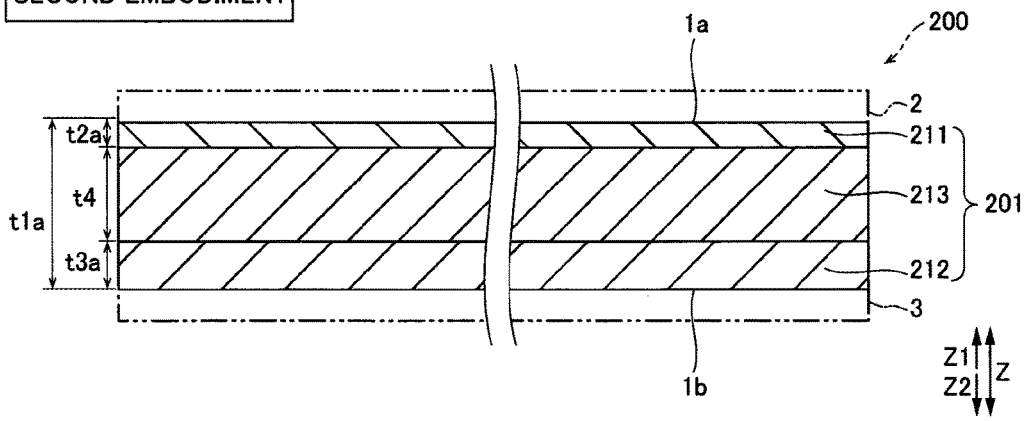

SECOND EMBODIMENT

FIG.7

SECOND EMBODIMENT (Al LAYER/CORE LAYER/Cu LAYER)

| | THICKNESS AFTER ROLLING (t2a/t4/t3a) (μm) | THICKNESS RATIO OF Al LAYER (%) | THICKNESS RATIO OF CORE LAYER (%) | WIDTH WARP AFTER ROLLING (mm) | LONGITUDINAL WARP AFTER ROLLING (mm) | WIDTH WARP AFTER HEAT TREATMENT (mm) |
|---|---|---|---|---|---|---|
| EXAMPLE 11 | 17/17/17 | 50 | 33 | +0.7 | +0.5 | -1.3 |

THICKNESS RATIO OF Al LAYER (%)=(t2a/(t2a+t3a))×100
THICKNESS RATIO OF CORE LAYER (%)=(t4/(t2a+t3a+t4))×100 though a step of applying pressure by roll pressing, therefore, the active material does not sufficiently penetrate into the surface of the collector. Therefore, the active material cannot be sufficiently brought into close contact with the collector, and hence it is conceivably difficult to increase the contact area between the collector and the active material. Consequently, contact resistance between the collector and the active material is conceivably increased. In general, therefore, it is difficult to prevent the collector from remarkable warps and to suppress increase in contact resistance between the collector and the active material.

CLADDING MATERIAL FOR BATTERY COLLECTOR AND ELECTRODE

CROSS REFERENCE TO RELATED APPLICATION

The present invention is a Divisional Application of U.S. patent application Ser. No. 14/725,116, filed on May 29, 2015, which is based upon and claims the benefit of priority from the subject matter related to Japanese Patent Application No. 2014-112310 filed in the Japan Patent Office on May 30, 2014, the entire contents of which being incorporated herein by reference.

BACKGROUND OF THE INVENTION

Field of the Invention

The present invention relates to a cladding material for a battery collector and an electrode employing the cladding material for a battery collector.

Description of the Background Art

A cladding material for a battery collector manufactured by bonding layers constituted of an Al-based alloy and a Cu-based alloy respectively to each other is known in general, as disclosed in Japanese Patent Laying-Open No. 8-7926 (1996), for example.

Japanese Patent Laying-Open No. 8-7926 discloses a bipolar lithium-ion secondary battery including a cladding material (a bipolar electrode) for a battery collector consisting of a cladding material manufactured by rolling aluminum foil having a thickness of 20 μm and copper foil having a thickness of 10 μm. The ratio of the thickness of the aluminum foil to the total thickness of the aluminum foil and the copper foil is about 67% (=20/(20+10))×100).

In the cladding material for a battery collector disclosed in Japanese Patent Laying-Open No. 8-7926, however, the side of the aluminum foil is elongated beyond the side of the copper foil when the aluminum foil and the copper foil are bonded to each other by rolling, since the aluminum foil more easily plastically deformable than the copper foil has the large thickness ratio of about 67%. Consequently, the cladding material for a battery collector is disadvantageously remarkably warped to be convexed on the side of the aluminum foil. When the cladding material for a battery collector is heat-treated, annealed and thereafter cooled to the room temperature, thermal shrinkage of the aluminum foil having a large thickness remarkably influences at the time of the cooling after the heat treatment, since the thermal expansion coefficient of the aluminum foil is larger than that of the copper foil. Therefore, the cladding material for a battery collector is also disadvantageously remarkably warped to be concaved on the side of the aluminum foil.

In order to solve the aforementioned problems, Japanese Patent Laying-Open No. 2010-33768 proposes a bipolar lithium-ion secondary battery including a collector consisting of stainless foil having a roughened surface with a thickness of not more than 50 μm. The collector consisting of the stainless foil proposed in Japanese Patent Laying-Open No. 2010-33768 is not a cladding material, and hence the same can be prevented from remarkable warps at the time of rolling or cooling after heat treatment.

While the collector consisting of the stainless foil described in Japanese Patent Laying-Open No. 2010-33768 can be prevented from remarkable warps, however, the stainless is a hard metallic material. When a slurry containing an active material is applied to the roughened surface of the collector, dried and thereafter solidified so that the active material is in close contact with the roughened surface

SUMMARY OF THE INVENTION

The present invention has been proposed in order to solve the aforementioned problems, and an object of the present invention is to provide a cladding material for a battery collector capable of preventing remarkable warps and suppressing increase in contact resistance between the cladding material and an active material and an electrode employing the cladding material for a battery collector.

The inventor has made deep studies for solving the aforementioned problems, to find that the problems can be solved by adjusting the ratios between the thicknesses of a first layer constituted of an Al-based alloy and a second layer constituted of a Cu-based alloy or by further providing a core layer having a high Young's modulus.

In other words, a cladding material for a battery collector according to a first aspect of the present invention consists of a cladding material having a two-layer structure formed by bonding a first layer arranged on a first surface and constituted of an Al-based alloy and a second layer arranged on a second surface and constituted of a Cu-based alloy to each other by rolling, while the ratio of the thickness of the first layer to the total thickness of the first layer and the second layer is not more than 35%. The term "Al-based alloy" indicates a wide concept including not only an Al alloy but also pure Al containing at least 99 mass % of Al. The term "Cu-based alloy" indicates a wide concept including not only a Cu alloy but also pure Cu containing at least 99 mass % of Cu. Due to the provision that the cladding material includes the first layer, the present invention does not include a case where the thickness ratio of the first layer is 0% (a case where no first layer is present).

In the cladding material for a battery collector according to the first aspect of the present invention, as hereinabove described, the ratio of the thickness of the first layer to the total thickness of the first layer constituted of the Al-based alloy and the second layer constituted of the Cu-based alloy is set to not more than 35% in the cladding material for a battery collector having the two-layer structure of the first and second layers bonded to each other by rolling. Thus, the first layer consisting of the easily plastically deformable Al-based layer has the small thickness ratio of not more than 35%, whereby influence by a warp resulting from the Al-based alloy can be reduced at the time of the rolling. Consequently, the cladding material for a battery collector can be prevented from a remarkable warp to be convexed on the side of the first layer. Also at the time of cooling after heat treatment, influence by a warp resulting from remarkable thermal shrinkage of the Al-based alloy can be reduced, whereby the cladding material for a battery collector can be prevented from a remarkable warp to be concaved on the side of the first layer. Consequently, the cladding material for a battery collector can be prevented from remarkable warps. Further, the first layer constituted of the flexible Al-based alloy is arranged on the first surface of the cladding material for a battery collector while the second layer constituted of the flexible Cu-based alloy is arranged on the second surface so that active materials can be sufficiently brought into close contact with the first and second surfaces when the same are arranged on the first and second surfaces due to the Al-based and Cu-based alloys more flexible than conventional stainless, whereby contact areas between the active materials and the cladding material for a battery collector can be increased. Thus, contact resistance between the cladding material for a battery collector and the active materials can be prevented from increase.

A cladding material for a battery collector according to a second aspect of the present invention consists of a cladding material formed by bonding a first layer arranged on a first surface and constituted of an Al-based alloy, a second layer arranged on a second surface and constituted of a Cu-based alloy and a core layer arranged between the first layer and the second layer and having a Young's modulus of at least 150 GPa to each other by rolling, while the ratio of the thickness of the first layer to the total thickness of the first layer and the second layer is not more than 60%.

In the cladding material for a battery collector according to the second aspect of the present invention, as hereinabove described, the core layer having the Young's modulus of at least 150 GPa is arranged between the first and second layers of the cladding material. Thus, influence by a warp resulting from the Al-based alloy can be reduced at the time of the rolling due to the core layer having the high Young's modulus and contributing to improvement in rigidity of the cladding material, also when the first layer consisting of the easily plastically deformable Al-based alloy has a relatively large thickness ratio of not more than 60%. Consequently, the cladding material for a battery collector can be prevented from a remarkable warp to be convexed on the side of the first layer. Also at the time of the cooling after the heat treatment, influence by a warp resulting from remarkable thermal shrinkage of the Al-based alloy can be reduced due to the core layer having the high Young's modulus and contributing to improvement in rigidity of the cladding material, whereby the cladding material for a battery collector can be prevented from a remarkable warp to be concaved on the side of the first layer. Consequently, the cladding material for a battery collector can be prevented from remarkable warps. Further, the first layer constituted of the flexible Al-based alloy is arranged on the first surface of the cladding material for a battery collector while the second layer constituted of the flexible Cu-based alloy is arranged on the second surface so that active materials can be sufficiently brought into close contact with the first and second surfaces when the same are arranged on the first and second surfaces due to the Al-based and Cu-based alloys more flexible than conventional stainless, whereby contact areas between the active materials and the cladding material for a battery collector can be increased. Thus, contact resistance between the cladding material for a battery collector and the active materials can be prevented from increase. In addition, the flexible first and second layers are so provided that reduction in rolling workability can be suppressed as compared with a case where the cladding material for a battery collector consists of only a hard single stainless plate. Thus, the cladding material for a battery collector can be efficiently manufactured, and a cost for the rolling can be reduced.

In the aforementioned cladding material for a battery collector according to the second aspect, the core layer is preferably constituted of an Ni-based alloy or an Fe-based alloy. According to this structure, both of the difference between the ionization tendencies of the metallic element (Ni or Fe) mainly constituting the core layer and Al mainly constituting the first layer and that between the ionization tendencies of the metallic element mainly constituting the core layer and Cu mainly constituting the second layer can be reduced since both of the ionization tendencies of Ni and Fe are between those of Al and Cu. Thus, the core layer consisting of the Ni-based alloy or the Fe-based alloy and the first layer constituted of the Al-based alloy can be prevented from corrosion therebetween, while the core layer and the second layer constituted of the Cu-based alloy can also be prevented from corrosion therebetween. Further, the core layer having the Young's modulus of at least 150 GPa and requiring a low cost can be easily obtained by employing the Ni-based alloy or the Fe-based alloy as the material therefor. The term "Ni-based alloy" indicates a wide concept including not only an Ni alloy but also pure Ni containing at least 99 mass % of Ni. The term "Fe-based alloy" indicates a wide concept including not only an Fe alloy but also pure Fe containing at least 99 mass % of Fe.

In this case, the core layer is preferably constituted of the Ni-based alloy which is pure Ni or an Ni—Nb alloy containing Nb. According to this structure, the pure Ni or the Ni—Nb alloy containing Nb has a high Young's modulus, whereby the core layer can sufficiently contribute to improvement in rigidity of the cladding material. Therefore, the cladding material for a battery collector can be further prevented from remarkable warps.

In the aforementioned cladding material for a battery collector according to the second aspect, the thickness of the core layer is preferably at least 30% and not more than 80% of the thickness of the cladding material. The thickness of the core layer is so set to at least 30% of the thickness of the cladding layer that the cladding material for a battery collector can be reliably prevented from remarkable warps by sufficiently ensuring the thickness of the core layer. Further, the thickness of the core layer is so set to not more than 80% of the thickness of the cladding layer that the thickness of the core layer contributing to improvement in rigidity of the cladding material can be prevented from excess increase, while the thicknesses of the first and second layers can be prevented from reduction. Thus, the first and second layers having small thicknesses can be prevented from breakage resulting from increase in pressure required for rolling the core layer having a large thickness. Consequently, the cladding material for a battery collector can be efficiently manufactured.

In the aforementioned cladding material for a battery collector according to the first aspect, the ratio of the thickness of the first layer to the total thickness of the first layer and the second layer is not more than 25%. According to this structure, the ratio of the thickness of the first layer can be further reduced, whereby influence by a warp resulting from the Al-based alloy can be further reduced at the time of the rolling, while influence by a warp resulting from remarkable thermal shrinkage of the Al-based alloy can be further reduced also at the time of the cooling after the heat treatment. Consequently, the cladding material for a battery collector can be further prevented from remarkable warps.

In the aforementioned cladding material for a battery collector according to the first aspect, the thickness of the cladding material is preferably not more than 100 µm. In general, a cladding material having a small thickness of not more than 100 µm is easily warped. According to the present invention, therefore, the ratio of the thickness of the first layer is so set to not more than 35% that small thickness of not more than 100 µm to be easily warped can be prevented from remarkable warps.

In this case, the thickness of the cladding material is preferably not more than 50 µm. Also when the cladding material for a battery collector has a smaller thickness and is more easily warped, the cladding material can be prevented from remarkable warps by setting the ratio of the thickness of the first layer to not more than 35%.

In the aforementioned cladding material for a battery collector according to the second aspect, the ratio of the thickness of the first layer to the total thickness of the first layer and the second layer is preferably not more than 50%. According to this structure, the ratio of the thickness of the first layer can be further reduced, whereby influence by a warp resulting from the Al-based alloy can be further reduced at the time of the rolling, while influence by a warp resulting from remarkable thermal shrinkage of the Al-based alloy can be further reduced also at the time of the cooling after the heat treatment. Consequently, the cladding material for a battery collector can be further prevented from remarkable warps.

In the aforementioned cladding material for a battery collector according to the second aspect, the thickness of the cladding material is preferably not more than 100 µm. The cladding material having such a small thickness of not more than 100 µm to be easily warped can also be prevented from remarkable warps by arranging the core layer having the Young's modulus of at least 150 GPa between the first and second layers as in the present invention.

In the aforementioned cladding material for a battery collector according to the second aspect, the core layer preferably has a smaller thermal expansion coefficient than the first layer and the second layer. According to this structure, the first layer can be prevented from remarkable shrinkage at the time of the cooling after the heat treatment, due to the core layer having the high Young's modulus and the small thermal expansion coefficient. Thus, the cladding material for a battery collector can be further prevented from remarkable warps.

An electrode according to a third aspect of the present invention includes a positive pole active material layer and a negative pole active material layer arranged on a first surface and a second surface of a cladding material for a battery collector respectively, while the cladding material for a battery collector consists of a cladding material having a two-layer structure formed by bonding a first layer arranged on the first surface and constituted of an Al-based alloy and a second layer arranged on the second surface and constituted of a Cu-based alloy to each other by rolling, and the ratio of the thickness of the first layer to the total thickness of the first layer and the second layer is not more than 35%.

The electrode according to the third aspect of the present invention can be prevented from remarkable warps and increase in contact resistance between the same and active materials, by employing the aforementioned cladding material for a battery collector according to the first aspect. When the electrode is formed by forming the active material layers on the surfaces of the cladding material for a battery collector, slurries containing the active materials are applied to the surfaces, then heat-treated and thereafter cooled. In this case, the cladding material for a battery collector (the electrode) can be prevented from remarkable warps at the time of the cooling after the heat treatment for forming the active material layers by setting the thickness ratio of the first layer to not more than 35%, similarly to the aforementioned structure according to the first aspect.

The aforementioned electrode according to the third aspect is preferably employed as a bipolar electrode. In general, a bipolar electrode is arranged in a multilayer structure. When an electrode prevented from remarkable warps as the electrode according to the third aspect is employed as a bipolar electrode, therefore, the bipolar electrode can be easily arranged in a multilayer structure to be in close contact with upper and lower layers.

In the aforementioned electrode according to the third aspect, the ratio of the thickness of the first layer to the total thickness of the first layer and the second layer is preferably not more than 25%. According to this structure, the cladding material for a battery collector can be further prevented from remarkable warps.

An electrode according to a fourth aspect of the present invention includes a positive pole active material layer and a negative pole active material layer arranged on a first surface and a second surface of a cladding material for a battery collector respectively, while the cladding material for a battery collector consists of a cladding material formed by bonding a first layer arranged on the first surface and constituted of an Al-based alloy, a second layer arranged on the second surface and constituted of a Cu-based alloy and a core layer arranged between the first layer and the second layer and having a Young's modulus of at least 150 GPa to each other by rolling, and the ratio of the thickness of the first layer to the total thickness of the first layer and the second layer is not more than 60%.

The electrode according to the fourth aspect of the present invention can be prevented from remarkable warps and increase in contact resistance between the same and active materials, by employing the aforementioned cladding material for a battery collector according to the second aspect. Further, the core layer having the Young's modulus of at least 150 GPa is so arranged between the first and second layers that the cladding material for a battery collector (the electrode) can be prevented from remarkable warps at the time of the cooling after the heat treatment for forming the active material layers by setting the thickness ratio of the first layer to not more than 35%, similarly to the aforementioned structure according to the second aspect.

In the aforementioned electrode according to the fourth aspect, the ratio of the thickness of the first layer to the total thickness of the first layer and the second layer is preferably not more than 50%. According to this structure, the cladding material for a battery collector (the electrode) can be further prevented from remarkable warps.

In the aforementioned electrode according to the fourth aspect, the core layer is preferably constituted of an Ni-based alloy or an Fe-based alloy. According to this structure, the core layer consisting of the Ni-based alloy or the Fe-based alloy and the first layer constituted of the Al-based alloy can be prevented from corrosion therebetween, while the core layer and the second layer constituted of the Cu-based alloy can also be prevented from corrosion therebetween. Further, the core layer having the Young's modulus of at least 150 GPa and requiring a low cost can be easily obtained by employing the Ni-based alloy or the Fe-based alloy as the material therefor.

In this case, the core layer is preferably constituted of the Ni-based alloy which is pure Ni or an Ni—Nb alloy containing Nb. According to this structure, the core layer can sufficiently contribute to improvement in rigidity of the cladding material since the pure Ni or the Ni—Nb alloy containing Nb has a high Young's modulus. Therefore, the cladding material for a battery collector (the electrode) can be further prevented from remarkable warps.

In the aforementioned electrode according to the fourth aspect, the thickness of the core layer is preferably at least 30% and not more than 80% of the thickness of the cladding material. The thickness of the core layer is so set to at least 30% of the cladding material that the cladding material for a battery collector (the electrode) can be reliably prevented from remarkable warps by sufficiently ensuring the thickness of the core layer. Further, the thickness of the core layer is so set to not more than 80% of the cladding material that the first and second layers having small thicknesses can be prevented from breakage resulting from increase in pressure required for rolling the core layer having the large thickness. Consequently, the cladding material for a battery collector (the electrode) can be efficiently manufactured.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a table showing results of first Example conducted in order to confirm effects of the present invention;

FIG. 6 is a sectional view showing a collector cladding material according to a second embodiment of the present invention; and FIG. 7 is a table showing results of second Example conducted in order to confirm effects of the present invention.

DESCRIPTION OF THE PREFERRED EMBODIMENTS

Embodiments of the present invention are now described with reference to the drawings.

First Embodiment

First, the structure of a collector cladding material 1 according to a first embodiment of the present invention is described with reference to FIGS. 1 and 2. The collector cladding material 1 is an example of the "cladding material for a battery collector" in the present invention.

Figure 1:
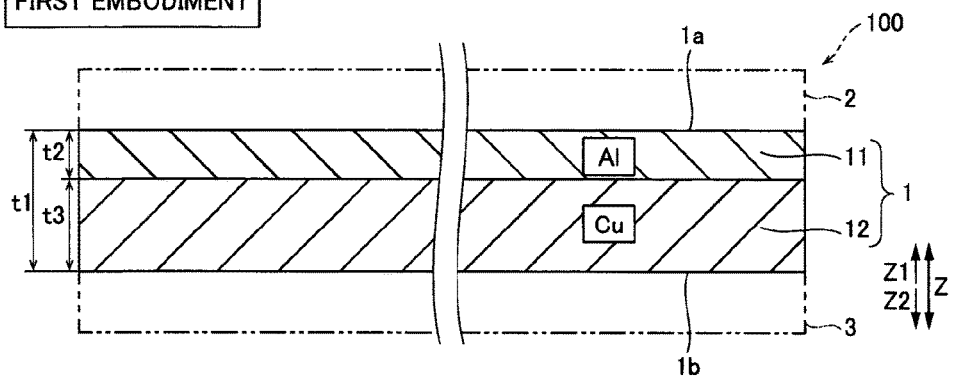
FIG. 1 is a sectional view showing a collector cladding material according to a first embodiment of the present invention.
Figure 2:
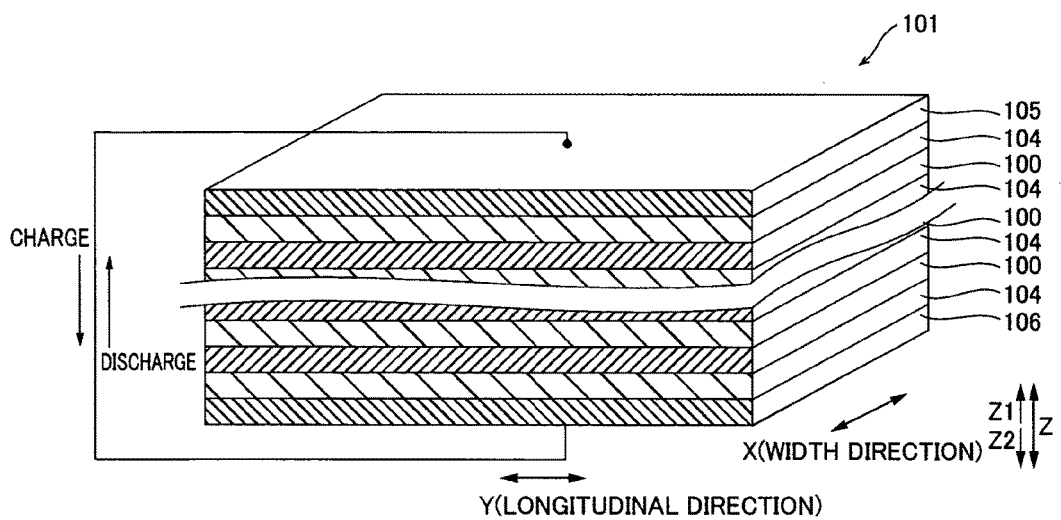
FIG. 2 is a perspective view showing a battery employing collector cladding materials according to the first embodiment of the present invention.

As shown in FIG. 1, the collector cladding material according to the first embodiment of the present invention functions as a collector for a secondary battery 101 (see FIG. 2). More specifically, the collector cladding material 1 is so configured that a positive pole active material layer 2 is formed on a surface 1a of a first side (along arrow Z1) in the thickness direction (a direction Z) and a negative pole active material layer 3 is formed on a surface 1b of a second side (along arrow Z2). Further, the collector cladding material 1 is configured to feed electricity generated from either the positive pole active material layer 2 or the negative pole active material layer 3 to either the negative pole active material layer 3 or the positive pole active material layer 2. In other words, this collector cladding material 1 is configured to function as a bipolar electrode 100 in the state provided with the positive pole active material layer 2 and the negative pole active material layer 3. The surfaces 1a and 1b are examples of the "first surface" and the "second surface" in the present invention respectively. The bipolar electrode 100 is an example of the "electrode" in the present invention.

The bipolar electrode 100 is configured to be employed as an intermediate electrode of the secondary battery 101 shown in FIG. 2. More specifically, a plurality of bipolar electrodes 100 are stacked in the thickness direction through solid electrolytes 104 constituted of a polymer, an oxide or a sulfide in the secondary battery 101. The bipolar electrodes 100 are so arranged that different poles are opposed to each other in the thickness direction through the solid electrolytes 104. The secondary battery 101 is so configured that electricity (electric power) is extracted from electrodes 105 and 106 arranged on the outermost layers at the time of discharging while electricity (electric power) is externally supplied at the time of charging. Thus, the electrodes 100 may not be connected with each other through bus bars, whereby electric loss can be reduced as compared with a case of connecting a plurality of battery cells through bus bars.

The collector cladding material 1 is a folly member having a thickness t1 of not more than about 100 μm, as shown in FIG. 1. The thickness t1 of the collector cladding material 1 is more preferably not more than about 50 μm, so that the thicknesses of the bipolar electrode 100 and the secondary battery 101 employing the same can be reduced. The collector cladding material 1 is easily warped when the thickness t1 is small, and hence an effect of the present invention (an effect of suppressing warps) is more increased.

In the collector cladding material 1, an Al layer 11 constituted of an Al-based alloy and a Cu layer 12 constituted of a Cu-based alloy are stacked in the thickness direction and bonded to each other by rolling. In other words, the collector cladding material 1 consists of a cladding material having a two-layer structure. The Al layer 11 is arranged on the surface 1a of the first side (along arrow Z1; the side of the positive pole active material layer 2) in the thickness direction, while the Cu layer 12 is arranged on the surface 1b of the second side (along arrow Z2; the side of the negative pole active material layer 3) in the thickness direction. The Al layer 11 and the Cu layer 12 are examples of the "first layer" and the "second layer" in the present invention respectively.

As the Al-based alloy constituting the Al layer 11, pure Al such as A1050 containing at least about 99 mass % of Al, an Al—Mn alloy such as A3003, an Al—Mg alloy such as A5052 or an Al—Mg—Si alloy such as A6061 can be employed. As the Cu-based alloy constituting the Cu layer 12, pure Cu such as C1020 (oxygen-free copper) containing at least about 99 mass % of Cu, a Cu—Fe alloy such as C1940 or a Cu—Zr alloy can be employed.

The Al-based alloy constituting the Al layer 11 is smaller in yield strength and easier to plastically deform as compared with the Cu-based alloy constituting the Cu layer 12. Further, the Al-based alloy has larger electric resistance as compared with the Cu-based alloy. More specifically, the electric resistivity of A1050 as an example of the Al-based alloy is about 28 nΩm at 20° C., and that of C1020 as an example of the Cu-based alloy is about 17 nΩm at 20° C. In addition, the Al-based alloy has a larger thermal expansion coefficient as compared with the Cu-based alloy. More specifically, the thermal expansion coefficient of A1050 as an example of the Al-based alloy is about $23 \times 10^{-6}$/K, and that of C1020 as an example the Cu-based alloy is about $17 \times 10^{-6}$/K.

According to the first embodiment, the collector cladding material 1 is so formed that the ratio of the thickness t2 of the Al layer 11 to the sum (the thickness t1 of the collector cladding material 1) of the thicknesses t2 and t3 of the Al layer 11 and the Cu layer 12 is not more than 35%. Thus, the collector cladding material 1 can be prevented from warps, as described later. Further, the thickness t3 of the Cu layer 12 constituted of the Cu-based alloy having small electric resistance can be increased, whereby the electric resistance of the collector cladding material 1 can also be reduced. The ratio of the thickness t2 of the Al layer 11 is more preferably not more than about 25%.

A manufacturing process for the collector cladding material 1 according to the first embodiment is now described with reference to FIG. 1.

First, an elongational Al plate material (not shown) constituted of an Al-based alloy and an elongational Cu plate material (not shown) constituted of a Cu-based are prepared. Both of the Al plate material and the Cu plate material are annealed. At this time, the thicknesses of the Al plate material and the Cu plate material are so adjusted that the ratio of the thickness t2 (see FIG. 1) of the Al layer 11 to the sum (the thickness t1 of the collector cladding material 1) of the thicknesses t2 and t3 of the Al layer 11 and the Cu layer 12 is not more than 35% after rolling.

Then, the elongational Al and Cu plate materials are stacked in the thickness direction (the direction Z), and rolled along the extensional direction thereof with a prescribed draft. Thereafter the rolled plate materials are diffusion-annealed at about 500° C. Thus, a strong joint is formed on the interface between the Al plate material and the Cu plate material by atomic diffusion or compound formation, to form a cladding material including the Al plate material and the Cu plate material bonded to each other. Then, the cladding material is cold-rolled to have the thickness t1 of not more than about 100 μm. Thus, the elongational collector cladding material 1 including the Al layer 11 and the Cu layer 12 bonded to each other and having thickness t1 is manufactured, as shown in FIG. 1. At the time of the cold rolling, residual stress resulting from plastic deformation is caused in the Al layer 11 and the Cu layer 12.

At the time of the rolling, the Al layer 11 is elongated beyond the Cu layer 12 since the Al-based alloy is more easily plastically deformable as compared with the Cu-based alloy. In the collector cladding material 1 according to the first embodiment, however, the thickness ratio of the Al layer 11 after the rolling is not more than 35%, whereby influence by a warp resulting from the Al-based alloy is reduced at the time of the rolling. Thus, the collector cladding material 1 is prevented from warps convexed on the side of the Al layer 11 (along arrow Z1) in both of the width direction (a direction X) and the longitudinal direction (a direction Y).

A manufacturing process for the secondary battery 101 according to the first embodiment is now described with reference to FIGS. 1 and 2.

First, a slurry prepared by mixing a positive pole active material, a binder and a solvent with each other is applied onto the surface 1a of the elongational collector cladding material 1 on the side of the Al layer 11 (along arrow Z1; see FIG. 1). At the time of the application of the slurry, tension is applied to the elongational collector cladding material 1 in the longitudinal direction (the direction Y), and hence a longitudinal warp is corrected to some extent. When the slurry is applied to the elongational collector cladding material 1, therefore, influence by a warp of the collector cladding material 1 in the width direction (the direction X) exceeds that by the longitudinal warp, and hence the extremely influential warp in the width direction is preferably sufficiently reduced at the time of the application of the slurry. When the slurry is applied to a previously cut collector cladding material 1, on the other hand, not only the influence by the warp in the width direction but also that by the longitudinal warp is conceivably increased, and hence both of the warp in the width direction and the longitudinal warp must be sufficiently reduced. In the collector cladding material 1 according to the first embodiment, both of the warp in the width direction and the longitudinal warp are suppressed, whereby the slurry can be uniformly applied onto the surface 1a of the collector cladding material 1.

Thereafter the slurry is dried by performing heat treatment at a prescribed temperature (about 150° C.). At the time of this heat treatment, the Al-based alloy constituting the Al layer 11 is annealed, thereby removing the residual stress caused at the time of the cold rolling. Consequently, a warp of the collector cladding material 1 convexed on the side of the Al layer 11 is reduced.

After the heat treatment, the collector cladding material 1 is cooled to the room temperature. Thus, the positive pole active material layer 2 is formed on the surface 1a, as shown in FIG. 1. At the time of this cooling, the Al layer 11 more remarkably shrinks than the Cu layer 12, due to difference in thermal shrinkage between the Al-based alloy and the Cu-based alloy. However, the thickness ratio of the Al layer 11 is not more than 35%, and hence influence by a warp resulting from remarkable thermal shrinkage of the Al-based alloy is reduced at the time of the cooling after the heat treatment. Thus, the collector cladding material 1 is prevented from a warp to be concaved on the side of the Al layer 11 (along arrow Z1).

Similarly to the formation of the positive pole active material layer 2, a slurry prepared by mixing a negative pole active material, a binder and a solvent with each other is applied onto the surface 1b of the elongational collector cladding material 1 on the side of the Cu layer 12 (along arrow Z2), heat-treated and cooled, thereby forming the negative pole active material layer 3 on the surface 1b. The positive and negative pole active material layers 2 and 3 may alternatively be simultaneously formed on the different surfaces 1a and 1b of the collector cladding material 1. Thus, the elongational bipolar electrode 100 is manufactured. Thereafter the elongational bipolar electrode 100 is cut into a prescribed size. The elongational bipolar electrode 100 (the collector cladding material 1) may alternatively be cut before applying the slurries to the collector cladding material 1.

Finally, a plurality of bipolar electrodes 100 and the solid electrolytes 104 constituted of a polymer, an oxide or a sulfide are alternately stacked with each other, while the electrodes 105 and 106 are arranged on the outermost layers along arrows Z1 and Z2 respectively. Thus, the secondary battery 101 shown in FIG. 2 is manufactured.

According to the first embodiment, the following effects can be attained:

According to the first embodiment, as hereinabove described, the ratio of the thickness t2 of the Al layer 11 to the total thickness (t1) of the Al layer 11 constituted of the Al-based alloy and the Cu layer 12 constituted of the Cu-based alloy is set to not more than 35% in the collector cladding material 1 having the two-layer structure of the Al layer 11 and the Cu layer 12 bonded to each other by rolling. Thus, influence of a warp resulting from the Al-based alloy can be reduced at the time of the rolling, since the thickness t2 of the Al layer 11 constituted of the easily plastically deformable Al-based alloy layer is at the small ratio of not more than 35%. Consequently, the collector cladding material 1 can be prevented from a remarkable warp to be convexed on the side of the Al layer 11 (along arrow Z1). Further, influence by a warp resulting from remarkable thermal shrinkage of the Al-based alloy can be reduced also at the time of the cooling after the heat treatment, whereby the collector cladding material 1 can be prevented from a remarkable warp to be concaved on the side of the Al layer 11. Consequently, the collector cladding material 1 can be prevented from remarkable warps.

According to the first embodiment, the Al layer 11 constituted of the flexible Al-based alloy is arranged on the surface 1a of the collector cladding material 1, while the Cu layer 12 constituted of the flexible Cu-based alloy is arranged on the surface 1b. Thus, the positive pole active material can be sufficiently brought into close contact with the surface 1a when the former is arranged on the latter due to the Al-based alloy more flexible than conventional stainless, whereby the contact area between the positive pole active material and the collector cladding material 1 can be increased. Further, the negative pole active material can be sufficiently brought into close contact with the surface 1b when the former is arranged on the latter due to the Cu-based alloy more flexible than the conventional stainless, whereby the contact area between the negative pole active material and the collector cladding material 1 can be increased. Consequently, contact resistance between the collector cladding material 1 and the active materials (the positive pole active material and the negative pole active material) can be prevented from increase as compared with a case where the collector cladding material 1 consists of a hard metallic material such as SUS.

According to the first embodiment, the ratio of the thickness t2 of the Al layer 11 is set to not more than 35% in the easily warped collector cladding material 1 having the thickness t1 of not more than about 100 μm, whereby the collector cladding material 1 (the bipolar electrode 100) can be prevented from remarkable warps. When the ratio of the thickness t2 of the Al layer 11 is set to not more than about 25%, the collector cladding material 1 can be further prevented from remarkable warps.

According to the first embodiment, the collector cladding material 1 is so configured that the positive pole active material layer 2 is arranged on the surface 1a and the negative pole active material layer 3 is arranged on the surface 1b, whereby the bipolar electrode 100 having the positive and negative pole active material layers 2 and 3 formed on the different surfaces 1a and 1b can be formed by the collector cladding material 1. Thus, the plurality of bipolar electrodes 100 stacked in the thickness direction through the solid electrolytes 104 can be easily arranged in a multilayer structure of the secondary battery 101 to be in close contact with the upper and lower solid electrolytes 104. At the time of the cooling after the heat treatment in the formation of the positive and negative pole active material layers 2 and 3, further, the collector cladding material 1 (the bipolar electrode 100) can be prevented from remarkable warps.

First Example

First Example conducted in order to confirm effects of the present invention is now described with reference to FIGS. 1 and 3 to 5.

In first Example, a plurality of collector cladding materials having two-layer structures including Al layers and Cu layers exhibiting different thickness ratios were prepared. Then, width-directional and longitudinal warps of the collector cladding materials were measured after roiling. Further, width-directional warps of the collector cladding materials were measured after heat treatment and cooling (after the heat treatment) of the collector cladding materials.

A collector cladding material 1 (see FIG. 1) according to Example 1 of first Example was prepared along the manufacturing process of the aforementioned first embodiment. More specifically, an elongational Al plate material constituted of A1050 (pure Al) and an elongational Cu plate material constituted of C1020 (pure Cu) were prepared. The Al and Cu plate materials were both annealed. At this time, the thicknesses of the Al and Cu plate materials were so adjusted that the ratio of the thickness of the Al plate material to the total thickness of the Al and Cu plate materials was 20%.

Then, the elongational Al and Cu plate materials were stacked in the thickness direction (the direction Z), and rolled along the extensional direction thereof with a draft of 50%. Thereafter the rolled plate materials were diffusion-annealed at 500° C. Then, the elongational collector cladding material 1 was prepared by cold-rolling the same to have a thickness t1 of 50 μm. Finally, the elongational collector cladding material 1 was cut into a rectangular shape having a width W (see FIG. 4) of 40 mm in the width direction (the direction X) and a length L (see FIG. 4) of 100 mm in the longitudinal direction (the direction Y).

Thus, the collector cladding material 1 according to Example 1 was so prepared that the ratio of the thickness t2 of an Al layer 11 to the sum (the thickness t1 of the collector cladding material 1) of the thicknesses t2 and t3 of the Al layer 11 and a Cu layer 12 was 20%.

Further, a collector cladding material 1 according to Example 2 was prepared similarly to Example 1, except that the ratio of the thickness t2 of an Al layer 11 was 30%. In addition, a collector cladding material according to comparative example 1 was prepared similarly to Example 1, except that the ratio of the thickness t2 of an Al layer 11 was 40%. Further, a collector cladding material according to comparative example 2 was prepared similarly to Example 1, except that the ratio of the thickness t2 of an Al layer 11 was 50%.

In the collector cladding materials according to Examples 1 and 2 and comparative examples 1 and 2, warps in the width direction (the direction X) and the longitudinal direction (the direction Y) after rolling were measured.

Figure 3:
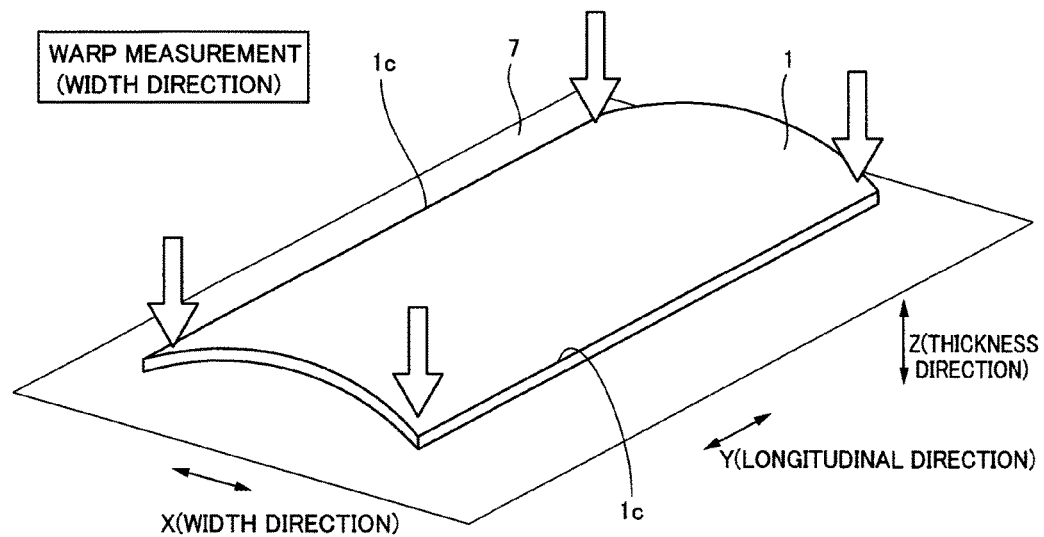
FIG. 3 is a perspective view for illustrating warp measurement in a width direction conducted in order to confirm effects of the present invention.

More specifically, each rectangular collector cladding material was arranged on a horizontal platen 7 serving as a reference plane in the warp measurement in the width direction, as shown in FIG. 3. Then, four corners of the rectangular collector cladding material were fixed with a jig (not shown) to correct a longitudinal warp, as shown by white arrows. The four corners were fixed to be as close as possible to pinpointed states. In this state, displacement in the thickness direction (the direction Z) along the width direction was measured by scanning the collector cladding material with a laser beam from a general laser displacement gauge. Then, maximum displacement was obtained as a width-directional warp by correcting a longitudinal warp of an edge 1c extending in the longitudinal direction (the direction Y) and setting displacement to 0 (zero).

Figure 4:
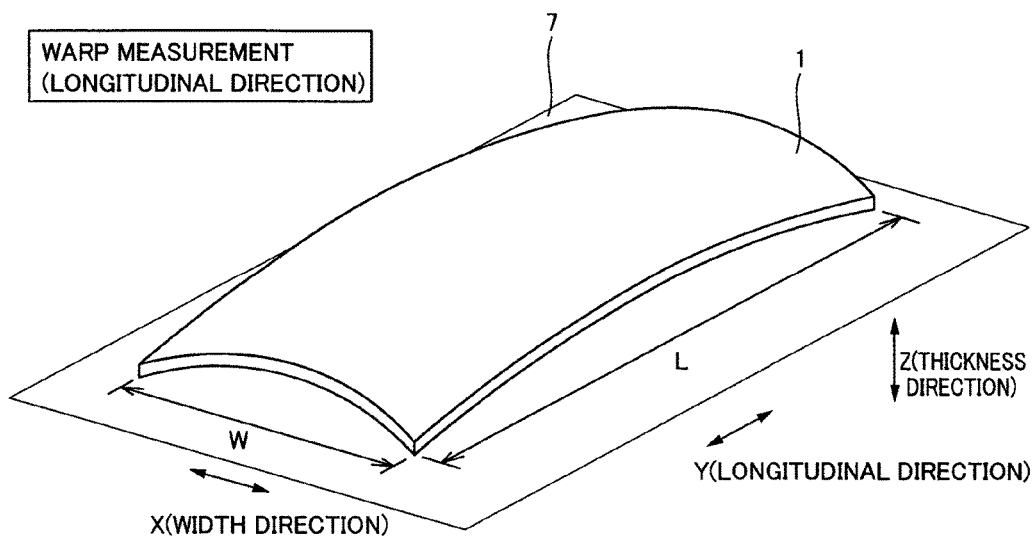
FIG. 4 is a perspective view for illustrating warp measurement in a longitudinal direction conducted in order to confirm effects of the present invention.

In longitudinal warp measurement, each rectangular collector cladding material was arranged on a platen 7, as shown in FIG. 4. Then, displacement in the thickness direction along the longitudinal direction was measured by longitudinally scanning the rectangular collector cladding material with a laser beam, without fixing four corners with a jig. Then, maximum displacement was obtained as a longitudinal warp.

Then, heat treatment was performed by holding the collector cladding materials according to Examples 1 and 2 and comparative examples 1 and 2 in a drier under a temperature environment of 150° C. After the collector cladding materials were cooled to the room temperature, width-directional warps after the heat treatment were measured similarly to the aforementioned width-directional warps after the rolling.

Referring to FIG. 5, each positive (+) numeral shows a warp to be convexed on the side of the Al layer 11 (along arrow Z1; see FIG. 1), while each negative (−) numeral shows a warp to be concaved on the side of the Al layer 11. In other words, each collector cladding material is less warped when the warp is close to zero (the absolute value is small), and the warp of the collector cladding material increases as the warp separates from zero (the absolute value increases), regardless of the positive or negative value.

As the results of first Example shown in FIG. 5, both of the collector cladding materials 1 according to Examples 1 and 2 were less warped as compared with those according to comparative examples 1 and 2. More specifically, the collector cladding materials 1 according to Examples 1 and 2 were warped after the rolling, to be convexed on the sides of the Al layers 11 by not more than 1.2 mm and 7.0 mm respectively in the width direction (the direction X) and the longitudinal direction (the direction Y). On the other hand, the collector cladding materials according to comparative examples 1 and 2 were warped after the rolling, to be convexed on the sides of the Al layers 11 in excess of 1.2 mm in the width direction and in excess of 7.0 mm in the longitudinal direction. Thus, it has been confirmable that the collector cladding materials 1 according to Examples 1 and 2 can be sufficiently prevented from warps after the rolling. This is conceivably because influence by a warp resulting from A1050 was reducible after the rolling since the thickness t2 of the Al layer 11 consisting of the easily plastically deformable A1050 (the Al-based alloy) was sufficiently smaller than the thickness t3 of the Cu layer 12 in each of the collector cladding materials 1 according to Examples 1 and 2.

Also after the heat treatment, the collector cladding materials 1 according to Examples 1 and 2 were warped to be concaved on the sides of the Al layers 11 by not more than 1.4 mm in the width direction. On the other hand, the collector cladding materials according to comparative examples 1 and 2 were warped after the heat treatment to be concaved on the sides of the Al layers 11 in excess of 1.4 mm in the width direction. Thus, it has been confirmable that the collector cladding materials 1 according to Examples 1 and 2 can be sufficiently prevented from warps also after the heat treatment. This is conceivably for the following reason: Residual stress caused at the time of the cold rolling is removed due to the annealing of A1050 constituting the Al layer 11 in the heat treatment. The collector cladding material 1 is cooled to the room temperature in the state where a warp to be convexed on the side of the Al layer 11 is reduced due to the removal of the residual stress, whereby the remarkably thermally shrinkable Al layer 11 extremely shrinks. However, the thickness t2 of the Al layer 11 consisting of the easily plastically deformable A1050 is sufficiently smaller than the thickness t3 of the Cu layer 12, whereby the collector cladding material 1 according to each of Examples 1 and 2 was conceivably prevented from a warp to be concaved on the side of the Al layer 11.

Consequently, it has been confirmable that the collector cladding material 1 can be sufficiently prevented from warps by setting the ratio of the thickness t2 of the Al layer 11 to the sum (the thickness t1 of the collector cladding material 1) of the thicknesses t2 and t3 of the Al layer 11 and the Cu layer 12 to 35% as in each of Examples 1 and 2, as compared with the case where the ratio of the thickness t2 of the Al layer 11 is larger than 35% as in each of comparative examples 1 and 2. It has also been confirmable that the thickness t2 of the Al layer 11 is more preferably set to not more than 25% (20%), in order to effectively prevent the collector cladding material 1 from warps.

In the collector cladding material 1 according to Example 2, the width-directional warp was reduced to about 31% (=(0.4/1.3)×100) as compared with comparative example 1, while the longitudinal warp was reduced to about 27% (=1.9/7.1)×100). Therefore, it has been confirmable in particular that the collector cladding materials 1 according to Examples 1 and 2 can be remarkably prevented from warps in the width direction and the longitudinal direction after the rolling as compared with the collector cladding materials according to comparative examples 1 and 2.

It has been proved that warps after the rolling and the heat treatment are reduced as the ratio of the thickness t2 of the Al layer 11 is reduced. Thus, it is conceivably preferable to reduce the thickness t2 of the Al layer 11 to the utmost. On the other hand, it is conceivably unpreferable to reduce the thickness t2 of the Al layer 11 (to not more than about 1 μm, for example) to a level causing breakage of the Al layer 11 in a manufacturing step.

While A1050 and C1020 were employed as the Al-based alloy and the Cu-based alloy constituting the Al layer 11 and the Cu layer 12 respectively in first Example, it is conceivably possible to prevent the collector cladding material from warps similarly to Examples 1 and 2 also in a case of employing another Al alloy such as an Al—Mn alloy, an Al—Mg alloy or an Al—Mg—Si alloy and another Cu alloy such as a Cu—Fe alloy or a Cu—Zr alloy as the Al-based alloy and the Cu-based alloy respectively, by setting the ratio of the thickness t2 of the Al layer 11 to not more than 35%.

Second Embodiment

A second embodiment of the present invention is now described with reference to FIG. 6. In a collector cladding material 201 according to the second embodiment, a core layer 213 having a Young's modulus of at least 150 GPa is provided between an Al layer 211 and a Cu layer 212, dissimilarly to the first embodiment. The Al layer 211 and the Cu layer 212 are examples of the "first layer" and the "second layer" in the present invention respectively.

The collector cladding material 201 according to the second embodiment is configured to function as a bipolar electrode 200 in a state provided with a positive pole active material layer 2 and a negative pole active material layer 3, as shown in FIG. 6. The collector cladding material 201 is a foily member having a thickness t1a of not more than about 100 μm. The collector cladding material 201 is an example of the "cladding material for a battery collector" in the present invention, and the bipolar electrode 200 is an example of the "electrode" in the present invention.

In the collector cladding material 201 according to the second embodiment, the Al layer 211 constituted of an Al-based alloy, the Cu layer 212 constituted of a Cu-based alloy and the core layer 213 arranged between the Al layer 211 and the Cu layer 212 are stacked in the thickness direction (a direction Z) and rolled to be bonded to each other. In other words, the collector cladding material 201 consists of a cladding material having a three-layer structure. The Al layer 211 is exposed on a surface 1a along arrow Z1, while the Cu layer 212 is exposed on a surface 1b along arrow Z2.

The core layer 213 is constituted of an Ni-based alloy or an Fe-based alloy having a Young's modulus of at least 150 GPa, and has a higher Young's modulus as compared with the Al-based alloy and the Cu-based alloy constituting the Al layer 211 and the Cu layer 212 respectively. Further, the Ni-based alloy or the Fe-based alloy constituting the core layer 213 has higher yield strength as compared with the Al-based alloy and the Cu-based alloy constituting the Al layer 211 and the Cu layer 212 respectively. In other words, the core layer 213 is higher in yield strength and Young's modulus than the Al layer 211 and the Cu layer 212, and hence the same is hardly plastically or elastically deformed.

As the Ni-based alloy, pure Ni such as NW2200 (normal carbon nickel; refer to JISH4551) containing at least about 99 mass % of Ni or an Ni alloy such as an Ni—Nb alloy constituted of at least about 3 mass % and not more than about 7 mass % of Nb, Ni and unavoidable impurity elements can be employed. As the Fe-based alloy, low-carbon steel (pure Fe) containing at least about 99 mass % of Fe or stainless such as SUS340 can be employed. The core layer 213 may simply be made of a metallic material having a Young's modulus of at least about 150 GPa. The Young's modulus of NW2200 as an example of the Ni-based alloy is about 195 GPa.

The Ni-based alloy has a smaller thermal expansion coefficient as compared with the Al-based alloy and the Cu-based alloy. More specifically, the thermal expansion coefficient of NW2200 as an example of the Ni-based alloy is about $13 \times 10^{-6}$/K.

According to the second embodiment, the collector cladding material 201 is so formed that the ratio of the thickness t2a of the Al layer 211 to the sum (=t2a+t3a) of the thicknesses t2a and t3a of the Al layer 211 and the Cu layer 212 is not more than about 60%. The ratio of the thickness t2a of the Al layer 211 is more preferably not more than about 50%.

The core layer 204 is so configured that the thickness t4 thereof is at least about 30% and not more than about 80% of the thickness t1a (=t2a+t3a+t4) of the collector cladding material 201. The remaining structures of the second embodiment are similar to those of the aforementioned first embodiment.

A manufacturing process for the collector cladding material 201 according to the second embodiment is now described with reference to FIG. 6.

First, an elongational Al plate material (not shown) constituted of an Al-based alloy, an elongational Cu plate material (not shown) constituted of a Cu-based alloy and a core (not shown) in the form of an elongational plate constituted of an Ni-based alloy or an Fe-based alloy having a Young's modulus of at least 150 GPa are prepared. All of the Al plate material, the Cu plate material and the core are annealed. At this time, the thicknesses of the Al plate material, the Cu plate material and the core are so adjusted that the ratio of the thickness t2a of the Al layer 211 to the sum (=t2a+t3a) of the thicknesses t2a and t3a of the Al layer 211 and the Cu layer 212 is not more than 60% and the thickness t4 of the core layer 204 is at least about 30% and not more than about 80% of the thickness t1a (=t2a+t3a+t4) of the collector cladding material 201 (see FIG. 6).

Then, Al plate material, the Cu plate material and the core are stacked in the thickness direction (the direction Z) and rolled along the extensional direction thereof with a prescribed draft. Thereafter the rolled materials are diffusion-annealed at a prescribed temperature. Thus, a cladding material including an Al layer, a core layer and a Cu layer bonded to each other is formed. Thereafter the cladding material is cold-rolled to have the thickness t1a of not more than about 100 μm. Thus, the elongational collector cladding material 201 having the thickness t1a and including the Al layer 211, the core layer 213 and the Cu layer 212 bonded to each other in this order in the thickness direction (the direction Z) is manufactured, as shown in FIG. 6. At the time of the rolling, influence of a warp resulting from the Al-based alloy is reduced due to the core layer 213 having the high Young's modulus and contributing to improvement in rigidity of the collector cladding material 201. Thus, the collector cladding material 201 is prevented from a warp to be convexed on the side of the Al layer 211 (along arrow Z1).

A manufacturing process for a battery in the second embodiment is similar to that in the aforementioned first embodiment. In other words, residual stress caused in the Al-based alloy at the time of the cold rolling is removed in the heat treatment, thereby reducing a warp of the collector cladding material 201 convexed on the side of the Al layer 211. At the time of the cooling after the heat treatment, the core layer 213 having the high Young's modulus and the small thermal expansion coefficient prevents the Al layer 211 from shrinkage, whereby the collector cladding material 201 is prevented from a warp to be concaved on the side of the Al layer 211.

According to the second embodiment, the following effects can be attained:

According to the second embodiment, as hereinabove described, the core layer 213 having the Young's modulus of at least 150 GPa is arranged between the Al layer 211 and the Cu layer 211 of the collector cladding material 201. Thus, influence by a warp resulting from the Al-based alloy can be reduced at the time of the rolling due to the core layer 213 having the high Young's modulus and contributing to improvement in rigidity of the collector cladding material 201, also when the Al layer 211 consisting of the easily plastically deformable Al-based alloy has a relatively large thickness ratio of not more than 60%. Consequently, the collector cladding material 201 can be prevented from a remarkable warp to be convexed on the side of the Al layer 211 (along arrow Z1). Also at the time of the cooling after the heat treatment, influence by a warp resulting from remarkable thermal shrinkage of the Al-based alloy can be reduced due to the core layer 213 having the high Young's modulus and contributing to improvement in rigidity of the collector cladding material 201, whereby the collector cladding material 201 can be prevented from a remarkable warp to be concaved on the side of the Al layer 211. Consequently, the collector cladding material 201 can be prevented from remarkable warps. When the thickness ratio of the Al layer 211 is set to not more than about 50%, further, influence by a warp resulting from the Al-based alloy can be further reduced at the time of the rolling and influence by a warp resulting from remarkable thermal shrinkage of the Al-based alloy can be reduced also at the time of the cooling after the heat treatment, due to the smaller thickness ratio of the Al layer 211. Consequently, the collector cladding material 201 can be further prevented from remarkable warps.

According to the second embodiment, the Al layer 211 constituted of the Al-based alloy more flexible than conventional stainless is arranged on the surface 1a of the collector cladding material 201 while the Cu layer 212 constituted of the Cu-based alloy more flexible than conventional stainless is arranged on the surface 1b, whereby contact resistance between the collector cladding material 201 and active materials (a positive pole active material and a negative pole active material) can be prevented from increase, similarly to the aforementioned first embodiment. In addition, the flexible Al and Cu layers 211 and 212 are so provided that reduction in rolling workability can be suppressed as compared with a case where the collector cladding material 201 consists of only a hard single stainless plate. Thus, the collector cladding material 201 (the bipolar electrode 200) can be efficiently manufactured, while a cost for the rolling can be reduced.

According to the second embodiment, the core layer 213 having the high Young's modulus and contributing to improvement in rigidity of the collector cladding material 201 is arranged between the Al layer 211 and the Cu layer 212, whereby the collector cladding material 201 can be prevented from deformation such as creasing resulting from repetition of expansion/shrinkage of the active materials caused by charging/discharging when the collector cladding material 201 is employed for a secondary battery. Thus, contact resistance between the collector cladding material 201 and the active materials can be prevented from increase resulting from dropping of the active materials (the positive pole active material and the negative pole active material) from the surfaces 1a and 1b of the deformed collector cladding material 201. Consequently, the collector cladding material 201 can be more preferably employed with respect to Si-based active materials or the like remarkably expanding/shrinking due to charging/discharging. Further, the core layer 213 has a smaller thermal expansion coefficient than the Al layer 211 and the Cu layer 212, whereby the Al layer 211 can be prevented from remarkable shrinkage at the time of the cooling after the heat treatment, due to the core layer 213 having the high Young's modulus and the small thermal expansion coefficient. Thus, the collector cladding material 201 (the bipolar electrode 200) can be further prevented from remarkable warps.

According to the second embodiment, the core layer 213 is constituted of the Ni-based alloy or the Fe-based alloy, whereby both of the difference between the ionization tendencies of the metallic element (Ni or Fe) mainly constituting the core layer 213 and Al mainly constituting the Al layer 211 and that between the ionization tendencies of the metallic element mainly constituting the core layer 213 and Cu mainly constituting the Cu layer 212 can be reduced since both of the ionization tendencies of Ni and Fe are between those of Al and Cu. Thus, the core layer 213 consisting of the Ni-based alloy or the Fe-based alloy and the Al layer 211 constituted of the Al-based alloy can be prevented from corrosion therebetween, while the core layer 213 and the Cu layer 212 constituted of the Cu-based alloy can also be prevented from corrosion therebetween. Further, the core layer 213 having the Young's modulus of at least 150 GPa and requiring a low cost can be easily obtained by employing the Ni-based alloy or the Fe-based alloy as the material therefor.

According to the second embodiment, the core layer 213 constituted of pure Ni or the Ni-based alloy which is an Ni—Nb alloy containing Nb can sufficiently contribute to improvement in rigidity of the collector cladding material 201 due to the high Young's modulus of pure Ni or the Ni—Nb alloy containing Nb. Therefore, the collector cladding material 201 (the bipolar electrode 200) can be further prevented from remarkable warps.

According to the second embodiment, the thickness t4 of the core layer 213 is set to at least about 30% of the thickness t1a of the collector cladding material 201, whereby the collector cladding material 201 can be reliably prevented from remarkable warps by sufficiently ensuring the thickness t4 of the core layer 213. Further, the thickness t4 of the core layer 213 is set to not more than about 80% of the thickness t1a of the collector cladding material 201, whereby the thickness t4 of the core layer 213 having the high Young's modulus can be prevented from excess increase, while the thicknesses t2a and t3a of the Al layer 211 and the Cu layer 212 can be prevented from reduction. Thus, the Al layer 211 and the Cu layer 212 having small thicknesses can be prevented from breakage resulting from increase in pressure required for rolling the core layer 213 having a large thickness t4. Consequently, the collector cladding material 201 (the bipolar electrode 200) can be efficiently manufactured.

According to the second embodiment, the collector cladding material 201 having the thickness t1a of not more than about 100 μm, easily warped in general and including the Al layer 211 having the ratio of the thickness t2a of not more than 60% is provided with the core layer 213 having the Young's modulus of at least 150 GPa, whereby the collector cladding material 201 (the bipolar electrode 200) can be prevented from remarkable warps. The remaining effects of the second embodiment are similar to those of the aforementioned first embodiment.

Second Example

Second Example conducted in order to confirm effects of the present invention is now described with reference to FIGS. 4, 6 and 7.

In second Example, a collector cladding material 201 according to Example 11 having a three-layer structure of an Al layer 211, a core layer 213 and a Cu layer 212 was prepared. Then, the collector cladding material 201 was subjected to measurement of width-directional and longitudinal warps at the time of roiling and a width-directional warp after heat treatment, similarly to the aforementioned first Example.

The collector cladding material 201 according to Example 11 of second Example was prepared along the manufacturing process in the aforementioned second embodiment. More specifically, an elongational Al plate material constituted of A1050 (pure Al), an elongational Cu plate material constituted of C1020 (pure Cu) and a core in the form of an elongational plate constituted of NW2200 (pure Ni) were first prepared. All of the Al plate material, the Cu plate material and the core were annealed. At this time, the thicknesses of the Al plate material, the Cu plate material and the core were so adjusted that the ratio of the thickness of the Al plate material to the total thickness of the Al plate material and the Cu plate material was 50% and that of the thickness of the core to the total thickness of the Al plate material, the Cu plate material and the core was 33%.

The elongational Al plate material, the elongational core and the elongational Cu plate material were stacked in the thickness direction (the direction Z), and subjected to rolling and diffusion annealing, similarly to the aforementioned first embodiment. Then, an elongational collector cladding material 201 was prepared by performing cold rolling to have a thickness of t1a of 50 μm. Finally, the elongational collector cladding material 201 was cut into a rectangular shape (see FIG. 4) having a width W of 40 mm in the width direction (the direction X) and a length L of 100 mm in the longitudinal direction (the direction Y). Thus, the collector cladding material 201 according to Example 11 was prepared so that the ratio of the thickness t2a of the Al layer 211 to the sum (=t2at3a) of the thicknesses t2a and t3a of the Al layer 211 and the Cu layer 212 was 50% and the thickness t4 of the core layer 204 to the sum (=t1a) of the thicknesses t2a, t3a and t4 of the Al layer 211, the Cu layer 212 and the core layer 213 was 33%.

In the collector cladding material 201 according to Example 11, warps in the width direction (the direction X) and the longitudinal direction (the direction Y) after the rolling as well as a width-directional warp after the heat treatment were measured, similarly to the aforementioned first Example. Referring to FIG. 7, each positive (+) numeral shows a warp to be convexed on the side of the Al layer 211 (see FIG. 6), while each negative (−) numeral shows a warp to be concaved on the side of the Al layer 211, similarly to the aforementioned first Example.

As the results of second Example shown in FIG. 7, the collector cladding material 201 according to Example 11 was warped to be convexed on the side of the Al layer 211 by not more than 1.2 mm and not more than 7.0 mm in the width direction (the direction X) and the longitudinal direction (the direction Y) respectively. Thus, it has been confirmable that the collector cladding material 201 according to Example 11 can be sufficiently prevented from warps after the rolling. This is conceivably because influence by a warp resulting from A1050 was reducible at the time of the rolling due to the core layer 213 constituted of NW2200 having the high Young's modulus of 195 GPa, although the Al layer 211 constituted of the easily plastically deformable A1050 (the Al-based alloy) had the relatively large thickness ratio of 50%.

Also after the heat treatment, the collector cladding material 201 according to Example 11 was warped in the width direction to be concaved on the side of the Al layer 211 by not more than 1.4 mm. Thus, it has been confirmable that the collector cladding material 201 according to Example 11 can be sufficiently prevented from a warp also after the heat treatment. This is conceivably because the remarkably thermally shrinkable Al layer 211 was preventable from remarkable shrinkage due to the core layer 213 having the high Young's modulus and contributing to improvement in rigidity of the collector cladding material 201.

Consequently, it has been confirmable that the collector cladding material 201 can be sufficiently prevented from warps due to the provision of the core layer 213 having the Young's modulus of at least 150 GPa, also when the ratio of the thickness t2a of the Al layer 211 to the sum of the thicknesses t2a and 53a of the Al and Cu layers 211 and 212 is set to not more than 60%.

When comparing the collector cladding material 201 according to Example 11 shown in FIG. 7 with the collector cladding material according to comparative example 2 shown in FIG. 5 including the Al layer having the thickness ratio of 50%, it has been confirmed that the collector cladding material 201 according to Example 11 provided with the core layer 213 was further prevented from warps both after the rolling and after the heat treatment. In particular, it has been proved that the longitudinal warp after the rolling was remarkably reduced to about 5% (=(0.5/10.1)×100).

While NW2200 was employed as the metallic material constituting the core layer 213 in Example 11 of second Example, the collector cladding material 201 can conceivably be prevented from warps similarly to Example 11 also when an Ni alloy such as an Ni—Nb alloy having a Young's modulus of at least 150 GPa, pure Fe or an Fe alloy such as stainless is employed as the material for the core layer 213, so far as the thickness ratio of the Al layer 211 is not more than 60%.

While the ratio of the thickness t2a of the Al layer 211 was set to 50% in Example 11 of second Example, the collector cladding material 201 can conceivably be prevented from warps similarly to Example 11 also when the ratio of the thickness t2a of the Al layer 211 is set to a value other than 50% and in the range of not more than 60%, so far as the Young's modulus of the core layer 213 is at least 150 GPa.

While the thickness t4 of the core layer 213 was set to 33% of the thickness t1a of the collector cladding material 201 in Example 11 of second Example, the collector cladding material 201 can conceivably be reliably prevented from warps similarly to Example 11 also when the thickness t4 of the core layer 213 is set to a value other than 33% and in the range of at least about 30% and not more than about 80%, so far as the ratio of the thickness t2a of the Al layer 211 is not more than 60%.

Although the present invention has been described and illustrated in detail, it is clearly understood that the same is by way of illustration and example only and is not to be taken by way of limitation, the spirit and scope of the present invention being limited only by the terms of the appended claims.

For example, while the core layer 213 consists of a single layer in the aforementioned second embodiment, the present invention is not restricted to this. According to the present invention, the core layer may alternatively be constituted of a plurality of layers. In this case, the plurality of layers are preferably so successively stacked that ionization tendencies are reduced from the first layer constituted of the Al-based alloy toward the second layer constituted of the Cu-based alloy. Thus, the collector cladding material can be effectively prevented from corrosion. When the core layer is constituted of a plurality of layers, the Young's modulus must be at least 150 GPa in the whole core layer, while the thickness of the whole core layer is preferably at least about 30% and not more than about 80% of the collector cladding material.

While the collector cladding materials 1 and 201 are employed as the bipolar electrodes 100 and 200 respectively in the aforementioned first and second embodiments, the present invention is not restricted to this. According to the present invention, the collector cladding material may alternatively be employed as a monopolar electrode provided with only either a positive pole active material layer or a negative pole active material layer.

While the core layer 213 is constituted of the Ni-based alloy or the Fe-based alloy having the Young's modulus of at least 150 GPa in the aforementioned second embodiment, the present invention is not restricted to this. According to the present invention, the core layer may simply be constituted of a metallic material having a Young's modulus of at least 150 GPa, and may alternatively be constituted of a metallic material other than the Ni-based alloy or the Fe-based alloy.

While the solid electrolytes 104 are employed in the secondary battery 101 in the aforementioned first embodiment, the present invention is not restricted to this. According to the present invention, liquid electrolytes (electrolytic solutions) may alternatively be employed in place of the solid electrolytes. In this case, the electrolytic solutions must be arranged between bipolar electrodes, which in turn must be so partitioned as not to short-circuit adjacent electrolytic solutions.

What is claimed is:

1. A cladding material for a battery collector consisting of a cladding material formed by bonding to each other by rolling
a core layer constituted of the Ni-based alloy or Fe-based alloy, having a first surface and a second surface, the core layer having a Young's modulus of at least 150 GPa,
a first layer arranged on the first surface and constituted of an Al-based alloy,
a second layer arranged on the second surface and constituted of a Cu-based alloy,
wherein the ratio of the thickness of the first layer to the total thickness of the first layer and the second layer is not more than 60% and the thickness of the core layer is at least 30% and not more than 80% of the thickness of the cladding material.

2. The cladding material for a battery collector according to claim 1, wherein
the core layer is constituted of the Ni-based alloy which is pure Ni or an Ni—Nb alloy containing Nb.

3. The cladding material for a battery collector according to claim 1, wherein
the ratio of the thickness of the first layer to the total thickness of the first layer and the second layer is not more than 50%.

4. The cladding material for a battery collector according to claim 1, wherein
the thickness of the cladding material is not more than 100 µm.

5. The cladding material for a battery collector according to claim 1, wherein
the core layer has a smaller thermal expansion coefficient than the first layer and the second layer.

6. An electrode including a positive pole active material layer and a negative pole active material layer arranged on a first side and a second side of a cladding material for a battery collector respectively, wherein the cladding material for a battery collector consists of a cladding material formed by bonding to each other by rolling a core layer constituted of the Ni-based alloy or Fe-based alloy, having a first surface and a second surface, the core layer having a Young's modulus of at least 150 GPa,
a first layer arranged on the first surface and constituted of an Al-based alloy, and
a second layer arranged on the second surface and constituted of a Cu-based alloy
wherein the ratio of the thickness of the first layer to the total thickness of the first layer and the second layer is not more than 60% and the thickness of the core layer is at least 30% and not more than 80% of the thickness of the cladding material.

7. The electrode according to claim 6, wherein
the ratio of the thickness of the first layer to the total thickness of the first layer and the second layer is not more than 50%.

8. The electrode according to claim 6, wherein
the core layer is constituted of the Ni-based alloy which is pure Ni or an Ni—Nb alloy containing Nb.

* * * * *